(12) United States Patent
Ogawa

(10) Patent No.: US 10,627,572 B2
(45) Date of Patent: Apr. 21, 2020

(54) OPTICAL WAVEGUIDE ELEMENT

(71) Applicant: FUJIKURA LTD., Tokyo (JP)

(72) Inventor: Kensuke Ogawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/990,989

(22) Filed: May 29, 2018

(65) Prior Publication Data

US 2018/0348430 A1 Dec. 6, 2018

(30) Foreign Application Priority Data

Jun. 1, 2017 (JP) ................................. 2017-109243

(51) Int. Cl.
| | |
|---|---|
| *G02B 6/26* | (2006.01) |
| *G02B 6/42* | (2006.01) |
| *G02B 6/10* | (2006.01) |
| *G02F 1/295* | (2006.01) |
| *G02B 6/122* | (2006.01) |
| *G02F 1/225* | (2006.01) |
| *G02B 6/12* | (2006.01) |
| *G02F 1/21* | (2006.01) |

(52) U.S. Cl.
CPC ......... *G02B 6/1228* (2013.01); *G02F 1/2257* (2013.01); *G02B 2006/12142* (2013.01); *G02B 2006/12159* (2013.01); *G02F 2001/212* (2013.01)

(58) Field of Classification Search
CPC ........ G02B 6/1228; G02B 2006/12142; G02B 2006/12159; G02F 1/2257; G02F 2001/212

USPC ...................... 385/2–3, 8–9, 43–45, 129–132
See application file for complete search history.

(56) References Cited

U.S. PATENT DOCUMENTS

| | | | |
|---|---|---|---|
| 2004/0208454 A1 | 10/2004 | Montgomery et al. | |
| 2010/0060970 A1* | 3/2010 | Chen .................. | G02F 1/025 359/245 |
| 2011/0206313 A1 | 8/2011 | Dong et al. | |
| 2012/0003767 A1* | 1/2012 | Fujikata ............... | G02F 1/025 438/31 |
| 2013/0188902 A1* | 7/2013 | Gardes ................ | G02F 1/025 385/2 |
| 2017/0168326 A1 | 6/2017 | Ogawa | |

FOREIGN PATENT DOCUMENTS

| | | | | |
|---|---|---|---|---|
| JP | 2017-15773 A | 1/2017 | | |
| WO | WO-2016208732 A1 * | 12/2016 | .......... | G02F 1/2257 |

* cited by examiner

*Primary Examiner* — Kaveh C Kianni
*Assistant Examiner* — Hung Q Lam
(74) *Attorney, Agent, or Firm* — Westerman, Hattori, Daniels & Adrian, LLP

(57) ABSTRACT

Provided is an optical waveguide element having a reduced optical loss, a lower driving voltage, and a reduced size. A rib waveguide core of an optical waveguide includes a first core region and a second core region which constitute a PN junction and which are provided so as to overlap each other in a horizontal direction. A depletion layer is formed between the first core region and the second core region. The depletion layer extends from a rib region to both of two slab regions. The depletion layer is located so as to be vertically lower in the slab regions than in the rib region.

10 Claims, 6 Drawing Sheets

(a)

(b)

OPTICAL WAVEGUIDE ELEMENT

This Nonprovisional application claims priority under 35 U.S.C. § 119 on Patent Application No. 2017-109243 filed in Japan on Jun. 1, 2017, the entire contents of which are hereby incorporated by reference.

TECHNICAL FIELD

The present invention relates to an optical waveguide element for use in an optical integrated circuit.

BACKGROUND ART

Recent years have seen research for using an optical integrated circuit including an optical waveguide element in various devices for optical fiber communication. Examples of devices for optical fiber communication include (i) an optical-transport device for use in long-distance, metro-network wavelength-division multiplexing optical fiber communication and (ii) an optical interconnect device for use at, for example, a data center.

Patent Literature 1 discloses, as an optical waveguide element for use in an optical integrated circuit, an optical waveguide element including a core having (i) two silicon layers having respective electrical conductivities different from each other and (ii) a dielectric layer sandwiched between the two silicon layers. The optical waveguide element disclosed in Patent Literature 1 has a so-called silicon capacitor (SISCAP) structure in which a P-type silicon layer and an N-type silicon layer serve as the respective two silicon layers and silicon dioxide serves as the dielectric layer.

The optical waveguide element disclosed in Patent Literature 1 is configured such that (i) light is confined with the use of the difference in refractive index between a sidewall of each silicon layer (i.e., an end of each silicon layer in the direction along a substrate surface) and the cladding and that (ii) an electric field, generated by light guided through the core, is distributed so as to spread across the two silicon layers and the dielectric layer. Therefore, by changing the respective carrier densities of the two silicon layers, it is possible to change the refractive index with respect to light guided through the core at a central portion of the core at which central portion the two silicon layers overlap each other via the dielectric layer.

Patent Literature 1 also discloses a SISCAP structure in which either the P-type silicon layer or the N-type silicon layer is bent into an L shape. Such a structure allows a region in which the carrier density varies to extend not only in a direction parallel to the substrate surface but also in a direction perpendicular to the substrate surface.

Patent Literature 2 discloses an optical waveguide element including a rib waveguide in which the depletion layer is provided in the horizontal direction or is provided so as to slightly incline from the horizontal direction, directly below the rib region.

Patent Literature 3 discloses an optical waveguide element including a rib waveguide, serving as a core section, which has a rib region and two slab regions. The two slab regions each have a height lower than that of the rib region, and are provided such that the rib region is sandwiched therebetween in the horizontal direction. The core section has a first core region and a second core region which (i) overlap each other in the horizontal direction and which (ii) constitute a PN junction. A depletion layer, provided between the first core region and the second core region, extends from the rib region to at least one of the two slab regions.

CITATION LIST

Patent Literature

[Patent Literature 1]
U.S. Patent Publication No. 2004/0208454 (Publication date: Oct. 21, 2004)
[Patent Literature 2]
U.S. Patent Publication No. 2011/0206313 (Publication date: Aug. 25, 2011)
[Patent Literature 3]
Japanese Patent Application Publication, Tokukai, No. 2017-015773 (Publication date: Jan. 19, 2017)

SUMMARY OF INVENTION

Technical Problem

The optical waveguide element disclosed in Patent Literature 1 is, as has been discussed, configured such that light is confined with the use of the difference in refractive index between a sidewall of each silicon layer (i.e., an end of each silicon layer in the direction along the substrate surface) and the cladding. Therefore, if the silicon layers have rough sidewalls, light guided through the core is scattered at the sidewalls. This leads to an increase in optical loss.

Further, the optical waveguide element disclosed in Patent Literature 1 is, as has been discussed, configured such that the region in which the carrier density varies is limited to the central portion of the core (at which central portion the two silicon layers overlap each other via the dielectric layer) and is not present across the entire region in which the electric field generated by light guided through the core is distributed. This means that, in order to increase the efficiency of refractive index modulation so as to lower the driving voltage, it is necessary to increase (1) the respective doping densities of the silicon layers or (2) the length of the element. In a case where the respective doping densities of the silicon layers are increased, the carrier absorbs more light. This leads to an increase in optical loss. Meanwhile, an increase in length of the element leads to an increase in size of the optical waveguide element.

As a secondary issue, the optical waveguide element disclosed in Patent Literature 1 is produced through a process including a special step of stacking silicon layers on a dielectric layer. The production process is thus complicated. As a result, the optical waveguide element disclosed in Patent Literature 1 is difficult to produce. In addition, it is also difficult to share a unified design rule with other optical circuits. This makes it difficult to integrate the optical waveguide element together with such other optical circuits. Production of the optical waveguide element requires, for example, a technique for reducing variations in thickness of a stacked layer to not more than 1 nm (nanometer) in order to reduce the optical loss and variations in optical property.

As another secondary issue, the optical waveguide element disclosed in Patent Literature 1 is configured such that an electric field, generated by light guided through the core, is distributed so as to spread across the silicon layers. This causes the profile of light guided through the core to be asymmetric in a direction parallel to the substrate surface, and ultimately causes the light guided through the core to contain a transverse electric field (TE) component and a transverse magnetic field (TM) component serving as polarized-wave components. As a result, integration of (i) the optical waveguide element disclosed in Patent Literature 1 and (ii) a polarization-division multiplexing optical circuit causes polarized-wave cross talk. This makes it difficult to transmit a polarization-division multiplexing optical signal.

The optical waveguide element disclosed in Patent Literature 2 is configured such that the depletion layer has an identical or approximately identical horizontal location in the rib region and the slab region of the rib waveguide. This makes it impossible to sufficiently increase the overlap between the waveguide mode and the depletion layer. The optical waveguide element disclosed in Patent Literature 2 therefore requires an increase in respective doping densities of the rib region and the slab region in order to reduce the driving voltage. This leads to an increase in optical loss as in the case of the technique disclosed in Patent Literature 1.

The present invention was made in view of the above problem, and a main object of the present invention is to provide an optical waveguide element that has a reduced optical loss, a lower driving voltage, and a reduced size.

Note that, though the optical waveguide element disclosed in Patent Literature 3 can attain the above main object, the optical waveguide element has the following problem. Specifically, the first core region and the second core region may be electrically disconnected at the boundary between the rib region and the respective slab regions, in a case where the slab regions vary in thickness or where the implantation density of the dopant varies during formation of the first core region and the second core region. Therefore, the optical waveguide element disclosed in Patent Literature 3 still has some room for improvement in that the tolerance to the manufacturing error is low, in other words, the yield is low. The present specification also encompasses the invention for improving such issues.

Solution to Problem

In order to attain the above main object, an optical waveguide element in accordance with an aspect of the present invention includes: a rib waveguide, serving as a core section, which includes (i) a rib region having a first height and (ii) two slab regions located such that the rib region is sandwiched, in a first direction, between the two slab regions, each of the two slab regions having a second height which is lower than the first height, the core section including a first core region and a second core region which are located so as to overlap each other in a second direction which is perpendicular to the first direction, the first core region and the second core region forming a PN junction, a depletion layer being formed between the first core region and the second core region, the depletion layer extending from the rib region to both of the two slab regions, the depletion layer being located so as to be lower, in the second direction, in each of the two slab regions than in the rib region, the rib region having a width, as measured at a location of the second height, which is wider than a width as measured at a location of the first height. a rib waveguide, serving as a core section, which includes (i) a rib region having a first height and (ii) two slab regions each having a second height which is lower than the first height, the two slab regions being provided such that the rib region is sandwiched therebetween in a first direction, the core section including a first core region and a second core region, provided so as to overlap each other in a second direction which is perpendicular to the first direction, which constitute a PN junction, the optical waveguide element being configured to form, between the first core region and the second core region, a depletion layer extending from the rib region to both of the two slab regions, the depletion layer being located so as to be lower, in the second direction, in each of the two slab regions than in the rib region, the rib region having a width which is wider in the second height than in the first height.

In order to attain the above object, an optical waveguide element in accordance with an aspect of the present invention includes: a rib waveguide, serving as a core section, which includes (i) a rib region having a first height and (ii) two slab regions located such that the rib region is sandwiched, in a first direction, between the two slab regions, each of the two slab regions having a second height which is lower than the first height, the core section including a first core region and a second core region which are located so as to overlap each other in a second direction which is perpendicular to the first direction, the first core region and the second core region forming a PN junction, a depletion layer being formed between the first core region and the second core region, the depletion layer extending from the rib region to both of the two slab regions, the depletion layer being located so as to be lower, in the second direction, in each of the two slab regions than in the rib region, in the rib region, a width of a lower end of the second core region being wider than a width of an upper end of the first core region.

In order to attain the above object, an optical waveguide element in accordance with an aspect of the present invention includes: a rib waveguide, serving as a core section, which includes (i) a rib region having a first height and (ii) two slab regions located such that the rib region is sandwiched, in a first direction, between the two slab regions, each of the two slab regions having a second height which is lower than the first height, the core section including a first core region and a second core region which are located so as to overlap each other in a second direction which is perpendicular to the first direction, the first core region and the second core region forming a PN junction, a depletion layer being formed between the first core region and the second core region, the depletion layer extending from the rib region to both of the two slab regions, the depletion layer being located so as to be lower, in the second direction, in each of the two slab regions than in the rib region, in the rib region, a width of a lower end of the first core region being wider than a width of an upper end of an undoped region which is located below the first core region in the rib region.

Advantageous Effects of Invention

An aspect of the present invention makes it possible to provide an optical waveguide element that has a reduced optical loss, a lower driving voltage, and a reduced size.

Figure 6:
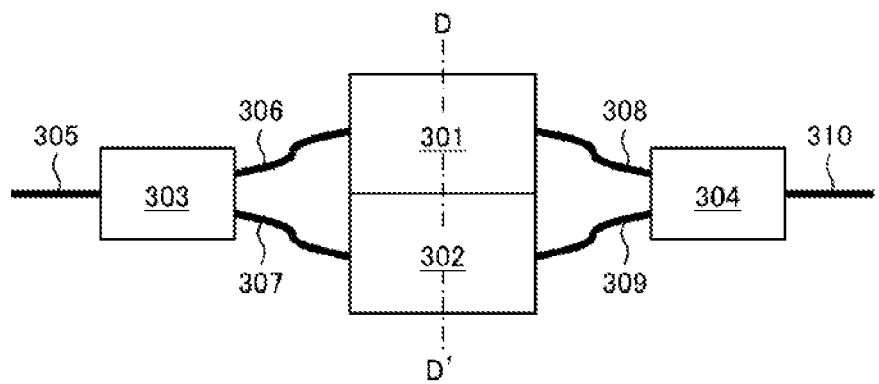
Figure 6:
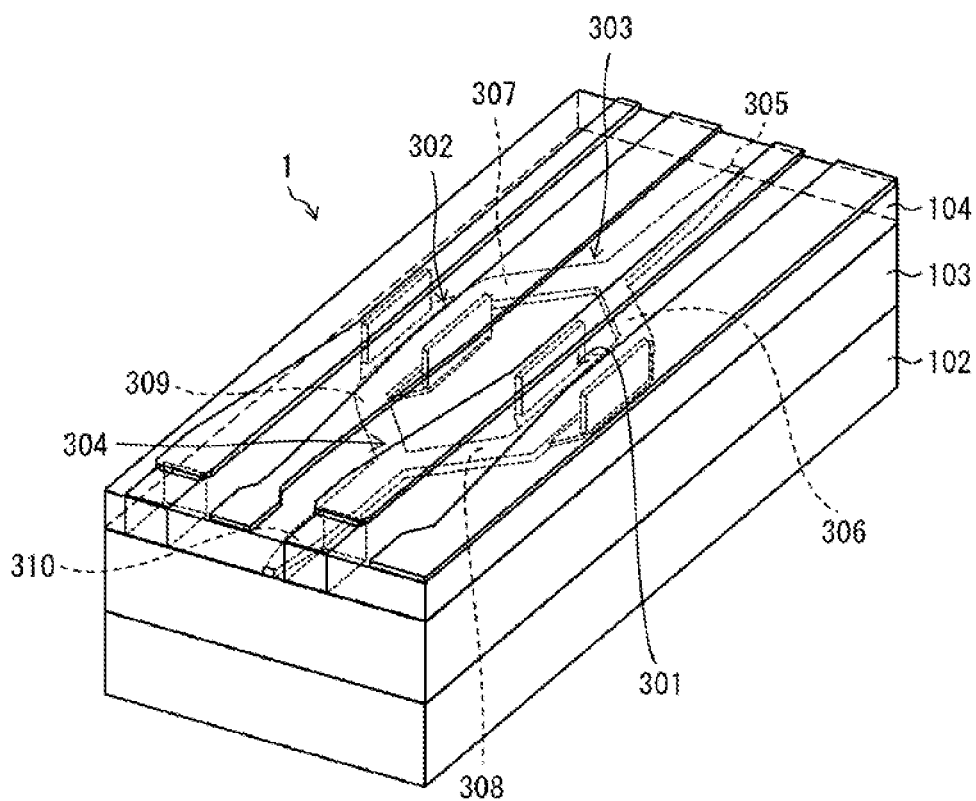

(a) of FIG. 6 is a block diagram showing a Mach-Zehnder interferometer, and (b) of FIG. 6 is a perspective view of a light modulator including a Mach-Zehnder interferometer.

Figure 7:
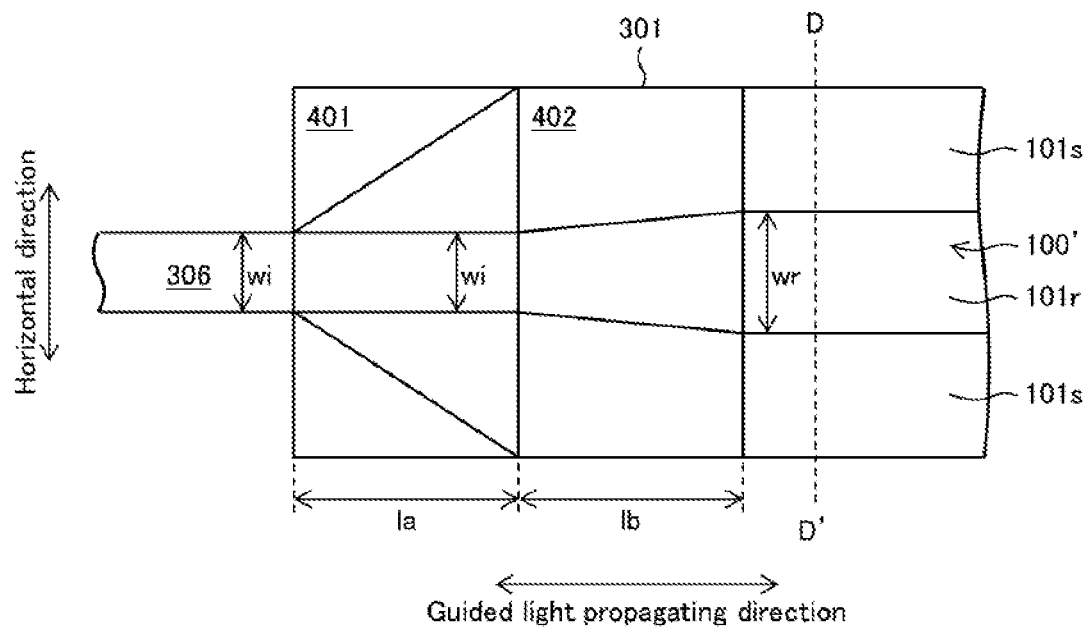

FIG. 7 is a top view of an optical waveguide element in accordance with Embodiment 2 of the present invention.

Figure 8:
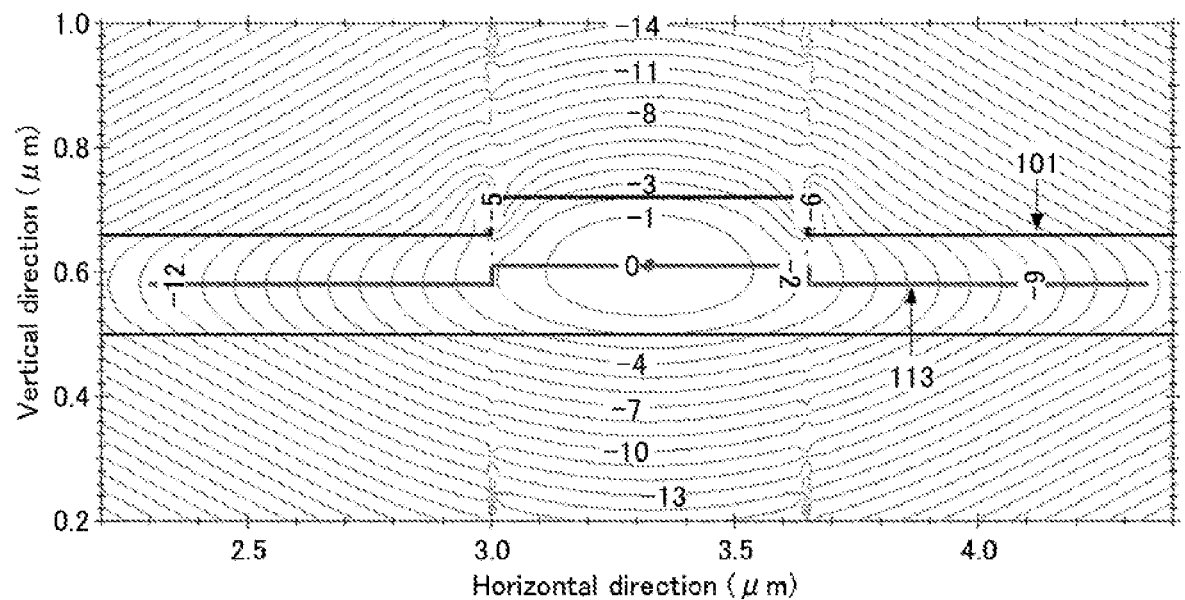

FIG. 8 is a graph illustrating an electric field profile of guided light at a depletion layer.

Figure 9:
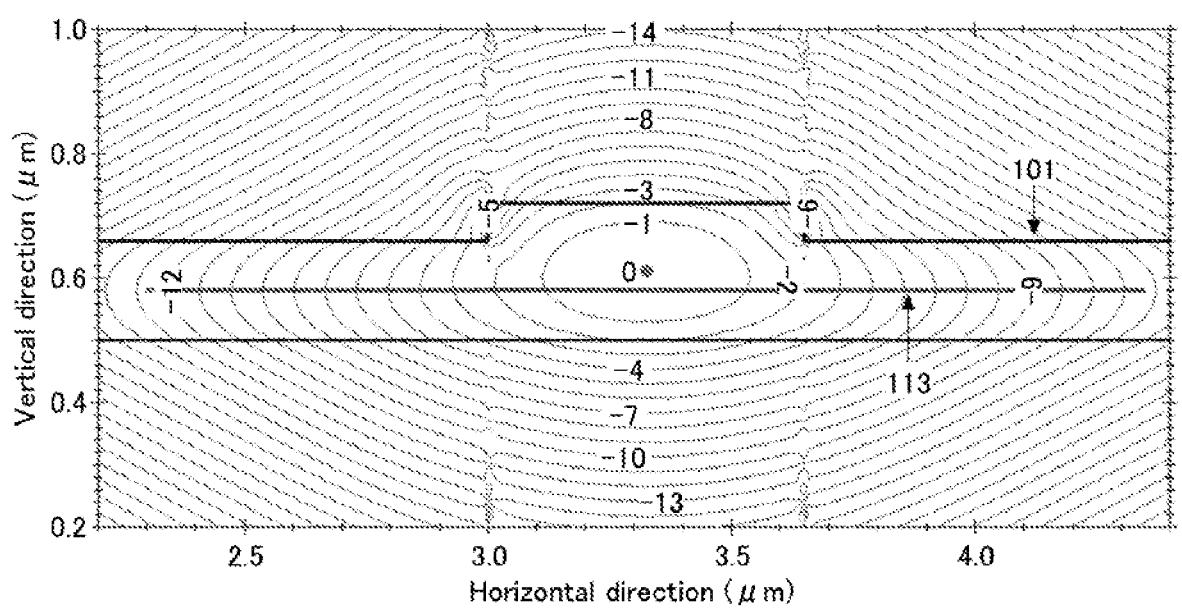

FIG. 9 is a graph illustrating another electric field profile of guided light at a depletion layer.

DESCRIPTION OF EMBODIMENTS

The following description will discuss embodiments of the present invention in detail with reference to FIGS. 1 to 9.

Embodiment 1

Figure 1:
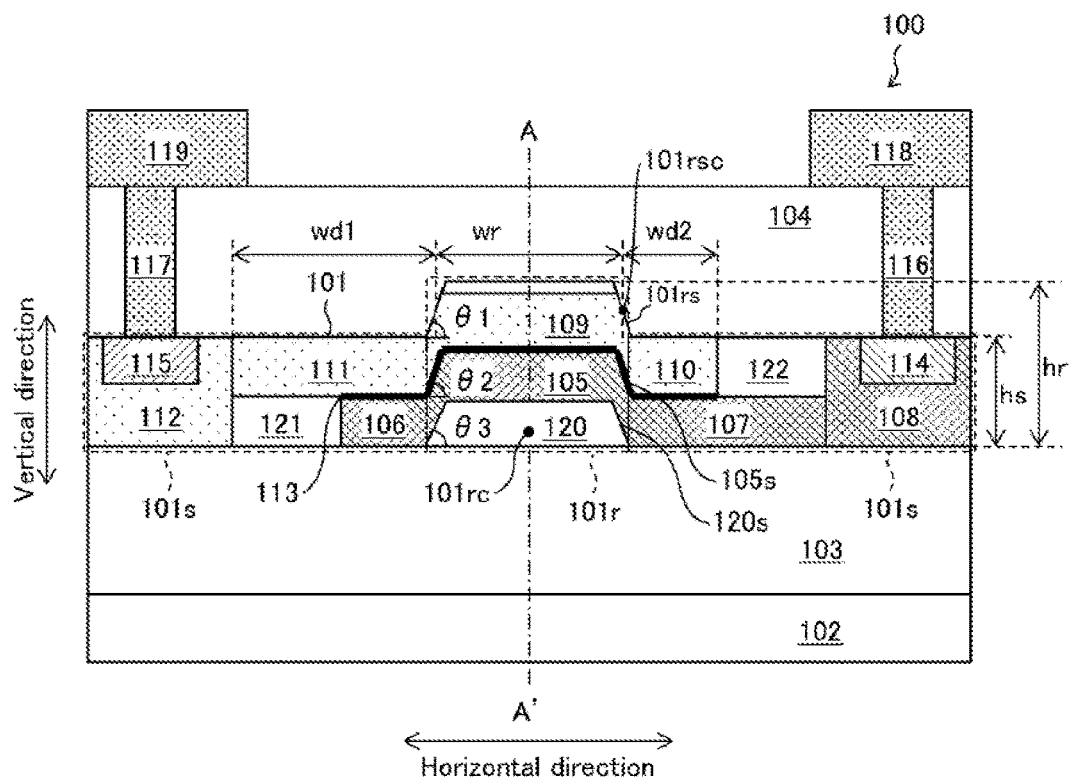
FIG. 1 is a cross-sectional view of an optical waveguide element in accordance with Embodiment 1 of the present invention.

FIG. 1 is a cross-sectional view of an optical waveguide element 100 in accordance with Embodiment 1 of the present invention. FIG. 1 also indicates a horizontal direction (first direction) and a vertical direction (second direction).

The optical waveguide element 100 includes a rib waveguide core (core section) 101, a substrate 102, a lower cladding 103, and an upper cladding 104. The lower cladding 103 is located on the substrate 102. The rib waveguide core 101 is located on the lower cladding 103. The upper cladding 104 is located on the rib waveguide core 101.

The optical waveguide element 100 is configured such that the substrate 102 and the lower cladding 103 share a flat interface. The horizontal direction indicated in FIG. 1 is a direction parallel to the interface, whereas the vertical direction indicated in FIG. 1 is a direction orthogonal to the interface. The upper cladding 104 side is located upside, whereas the substrate 102 side is located downside, in the vertical direction.

The rib waveguide core 101 has a rib region 101r and two slab regions 101s. The rib region 101r is located at a center portion in the horizontal direction of the cross section illustrated in FIG. 1. The slab regions 101s are located such that the rib region 101r is sandwiched, in the horizontal direction, between the slab regions 101s. In FIG. 1, "wr" indicates a width (i.e., a length in the horizontal direction) of the rib region 101r, "hr" indicates a thickness (i.e., a length in the vertical direction) of the rib region 101r, and "hs" indicates a thickness of each of the slab regions 101s. Note that (i) a height, relative to a height of a lower end of the rib waveguide core 101, of an upper end of the rib region 101r will sometimes be hereinafter referred to as a height hr (first height) and (ii) a height, relative to the height of the lower end of the rib waveguide core 101, of an upper end of each of the slab regions 101s will sometimes be hereinafter referred to as a height hs (second height). The height hs is lower than the height hr.

A part of the rib region 101r, which part is located above the respective upper surfaces of the slab regions 101s, will be hereinafter referred to as a protruding section. That is, the rib region 101r is an area which includes (i) the protruding section and (ii) a part of the rib waveguide core 101 which part is located directly below the protruding section.

In the cross section illustrated in FIG. 1, the rib waveguide core 101 is linearly symmetric with respect to an axis (indicated by a dotted-and-dashed line A-A') extending in the vertical direction through a central point 101rc, in the horizontal direction, of the rib region 101r. Furthermore, the protruding section has sidewalls 101rs each of which is inclined from both of the horizontal direction and the vertical direction. A direction of the inclination will be hereinafter referred to as an "oblique direction." In each of embodiments, a width wr of the rib region 101r refers to a width (i.e., a length in the horizontal direction) obtained when a central point 101rsc, in the vertical direction, of the sidewalls 101rs is an edge. The same applies to each of widths wd1 and wd2 later described.

Guided light (i.e., light guided through the rib waveguide core 101) is locally present in the rib region 101r and its vicinity, and propagates in a direction (third direction) orthogonal to the cross section illustrated in FIG. 1. The optical waveguide element 100 is designed so that guided light propagating through the rib waveguide core 101 contains only a TE component in a fundamental mode. Guided light has a wavelength that falls within a wavelength range used for optical communication and optical interconnect, that is, a wavelength that falls within a range of 1200 nm to 1700 nm.

The rib waveguide core 101 and the substrate 102 are each made of, for example, crystalline silicon. The lower cladding 103 and the upper cladding 104 are each made of, for example, silicon dioxide (silica). In a case where the respective materials for the rib waveguide core 101, the substrate 102, the lower cladding 103, and the upper cladding 104 are selected as above, the optical waveguide element 100 can be produced with the use of an SOI (silicon-on-insulator) wafer. The rib waveguide core 101 can be an SOI layer made of crystalline silicon. The lower cladding 103 can be a built-in silica (BOX) layer. The upper cladding 104 can be formed by disposing silica on the rib waveguide core 101.

Recent years have seen a widespread use of an SOI wafer including an SOI layer having a thickness of approximately 220 nm. The optical waveguide element 100 has hr of 220 nm so as to be capable of being produced with the use of such an SOI wafer. In order to avoid propagation of (i) guided light containing a TE component in a higher mode and (ii) guided light containing a TM component, it is preferable that hs is not less than 150 nm. Furthermore, in order to (i) prevent guided light containing a TE component in the fundamental mode from being emitted from the rib waveguide core 101 and (ii) avoid attenuation of guided light, it is preferable that hs is not more than 180 nm and wr is not less than 450 nm. In a case where wr is not less than 450 nm, it is suitably possible to reduce an optical loss caused by roughness of the sidewalls 101rs.

In order to carry out refractive index modulation on the basis of carrier plasma dispersion caused by free carrier absorption, the rib waveguide core 101 has a PN junction. That is, in the optical waveguide element 100, a carrier density is changed at the PN junction so as to cause a change in refractive index. The inventor of the present invention has invented a layout of electrically conductive regions (including a depletion layer) inside the rib waveguide core 101 and, with the use of the layout thus invented, has achieved a reduced optical loss, a lowered driving voltage, and an increased modulation frequency.

As illustrated in FIG. 1, the rib waveguide core 101 can be roughly divided into (1) a first core region (cross-hatched region in FIG. 1), (2) a second core region (thickly dot-hatched region in FIG. 1), and (3) undoped regions (with no hatching in FIG. 1). A first dopant (e.g., P-type dopant) is implanted to the first core region having a first electrical conductivity. A second dopant (e.g., N-type dopant) is implanted to the second core region having a second electrical conductivity. No dopant is intentionally implanted to the undoped regions.

The first core region is composed of a central region (part of the first core region) 105, lateral regions (parts of the first core region) 106 and 107, and a connection region (part of the first core region) 108. The central region 105, the lateral regions 106 and 107, and the connection region 108 each have the first electrical conductivity, are electrically connected to each other, and form the first core region together.

The central region 105 belongs, in the first core region, to the rib region 101r. The lateral region 106 belongs, in the first core region, to one of the slab regions 101s. The lateral region 107 of the first core region belongs to the other of the slab regions 101s. The central region 105 has an upper surface and a lower surface which are located so as to be higher, in the vertical direction, than an upper surface and a lower surface of the lateral regions 107 and 108, respectively. An undoped region 120 is located, below the central region 105, so as to be sandwiched between the lateral regions 107 and 106. The central region 105 and the lateral regions 106 and 107 each have a thickness of approximately hs/2. The central region 105 has a lower surface (an upper surface of the undoped region 120) which is located so as to be lower, in the vertical direction, than the upper surfaces of the respective lateral regions 106 and 107. Therefore, (i) an upper end of a right side surface of the lateral region 106 is in contact with a lower end of a left side surface of the central region 105, and (ii) an upper end of a left side surface of the lateral region 107 is in contact with a lower end of a right side surface of the central region 105. Note that the lateral region 106 has a left side surface which is in contact with an undoped region 121. The lateral region 107 has a right side surface which is in contact with the connection region 108. The connection region 108 has a thickness of hs. The central region 105 has a width of wr. The lateral region 106 has a width of wd2. The lateral region 107 has a width of wd1.

The second core region has a central region (part of the second core region) 109, lateral regions (parts of the second core region) 110 and 111, and a connection region (part of the second core region) 112. The central region 109, the lateral regions 110 and 111, and the connection region 112 each have the second electrical conductivity, are electrically connected to each other, and form the second core region together.

The central region 109 belongs, in the second core region, to the rib region 101r. The lateral region 111 belongs, in the second core region, to one of the slab regions 101s. The lateral region 110 belongs, in the second core region, to the other of the slab regions 101s. The central region 109 is composed of an upper surface and a lower surface, which are located so as to be higher, in the vertical direction, than an upper surface and a lower surface of the lateral region 110, respectively. The upper surface and the lower surface of the central region 109 are located so as to be higher, in the vertical direction, than the upper surface and the lower surface of the lateral region 111, respectively. The central region 105 of the first core region is located, below the central region 109, so as to be sandwiched between the lateral regions 110 and 111. The central region 109 and the lateral regions 110 and 111 each have a thickness of approximately hs/2. The central region 109 has a lower surface (i.e., the upper surface of the central region 105 of the first core region) which is located so as to be lower, in the vertical direction, than upper surfaces of the respective lateral regions 110 and 111. Therefore, (i) an upper end of a right side surface of the lateral region 111 is in contact with the lower end of the left side surface of the central region 109 and (ii) an upper end of a left side surface of the lateral region 110 is in contact with the lower end of the right side surface of the central region 109. Note that the lateral region 110 has a right side surface which is in contact with an undoped region 122. The lateral region 111 has a left side surface which is in contact with the connection region 112. The connection region 112 has a thickness of hs. The central region 109 has a width of wr. The lateral region 110 has a width of wd2. The lateral region 111 has a width of wd1.

The optical waveguide element 100 is configured such that the central region 109 of the second core region is not so tall as to reach the top of the rib region 101r. However, in a case where it is possible to further increase, for example, the efficiency of refractive index modulation without increasing the optical loss in the optical waveguide element, the central region 109 of the second core region can be so tall as to reach the top of the rib region 101r.

The optical waveguide element 100 is configured such that the connection regions 108 and 112 are separated, in the horizontal direction, from the rib region 101r. This arrangement is intended to reduce the optical loss caused by free carrier absorption. The distance between the central point 101rc and the connection region 108 and the distance between the central point 101rc and the connection region 112 can each be set as appropriate in correspondence with, for example, a degree of optical loss tolerated in the optical waveguide element 100 and/or an operating frequency of the optical waveguide element 100.

In the rib region 101r of the rib waveguide core 101, (i) the central region 105 of the first core region and (ii) the central region 109 of the second core region are located so as to overlap each other in the vertical direction. In one of the slab regions 101s of the rib waveguide core 101, the lateral region 106 of the first core region and the lateral region 111 of the second core region are located so as to overlap each other in the vertical direction. In the other of the slab regions 101s of the rib waveguide core 101, the lateral region 107 of the first core region and the lateral region 110 of the second core region are located so as to overlap each other in the vertical direction.

The description below assumes a case where the first electrical conductivity of the first core region (which is composed of the central region 105, the lateral regions 106 and 107, and the connection region 108) is a P-type, whereas the second electrical conductivity of the second core region (which is composed of the central region 109, the lateral regions 110 and 111, and the connection region 112) is an N-type. In such a case, the first core region having the first electrical conductivity (P-type) and the second core region having the second electrical conductivity (N-type) form a PN junction. By applying a predetermined reverse bias voltage to a part in which the PN junction is formed, a depletion layer 113 is formed at a boundary of the PN junction. The depletion layer 113 is formed so as to extend from the rib region 101r toward the slab regions 101s.

The optical waveguide element 100 in accordance with Embodiment 1 employs a configuration in which sidewalls 120s of the undoped region 120 are each inclined so that a width of an upper end of the undoped region 120 is narrower than that of a lower end of the undoped region 120. Typically, a width (i.e., a width of the central region 105 as measured at locations of the height of the upper surfaces of the respective lateral regions 106 and 107) of a lower end of the central region 105 of the first core region, stacked on the undoped region 120, matches the width of the lower end of the undoped region 120. With such a configuration, the width of the lower end of the central region 105 is wider than that of the upper end of the undoped region 120. This causes a constriction of the first core region to be hard to occur (i) between the central region 105 and the lateral region 106 and (ii) between the central region 105 and the lateral region 107, as compared with a case where the sidewalls 120s of the undoped region 120 are each configured to be orthogonal to the upper surface of the lower cladding 103. Therefore, an electrical disconnection of the first core region is hard to occur (i) between the central region 105 and the lateral region 106 and (ii) between the central region 105 and the lateral region 107, even in a case where a uniform thickness of the first core region is fluctuated or even in a case where a density at which a P-type dopant or an N-type dopant is implanted is fluctuated.

The optical waveguide element 100 in accordance with Embodiment 1 employs a configuration in which the sidewalls 105s of the central region 105 of the first core region are each inclined so that a width (i.e., the width of the central region 105 of the first core region as measured at the locations of the height of the upper surfaces of the respective lateral regions 106 and 107 of the first core region) of an upper end of the central region 105 of the first core region is narrower than a width of the lower end of the central region 105 of the first core region. Typically, a width (i.e., a width of the central region 109 as measured at locations of the height of the upper surfaces of the respective lateral regions 110 and 111) of a lower end of the central region 109 of the second core region, stacked on the central region 105 of the first core region, matches the width of the lower end of the central region 105 of the first core region. Therefore, in a case of employing the configuration, the width of the lower end of the central region 109 of the second core region is wider than that of the upper end of the central region 105 of the first core region. This causes a constriction of the second core region to be hard to occur (i) between the central region 109 and the lateral region 110 and (ii) between the central region 109 and the lateral region 111, as compared with a case where the sidewalls 105s of the central region 105 of the first core region are each configured to be orthogonal to the upper surface of the lower cladding 103. Therefore, an electrical disconnection of the second core region is hard to occur (i) between the central region 109 and the lateral region 110 and (ii) between the central region 109 and the lateral region 111, even in a case where a uniform thickness of the second core region is fluctuated or even in a case where a density at which the P-type dopant or the N-type dopant is implanted is fluctuated.

Note that, if (i) the first core region and the second core region each have a uniform thickness or a substantially uniform thickness and (ii) the sidewalls 101rs of the rib region 101r are each inclined such that a width of the rib region 101r, as measured at a location of the height hs of the slab region 101s, becomes wider than a width of the rib region 101r, as measured at a location of the height hr, then the sidewalls 120s of the undoped region 120 and the sidewalls 105s of the central region 105 of the first core region are definitely inclined as has been discussed. This causes (i) a width of a lower end of the central region 105 to become wider than that of the upper end of the undoped region 120 and (ii) a width of a lower end of the central region 109 in the second core region to become wider than that of the upper end of the central region 105 in the first core region. Therefore, an electrical disconnection of the first core region is hard to occur (i) between the central region 105 and the lateral region 106 and (ii) between the central region 105 and the lateral region 107. Moreover, an electrical disconnection of the second core region is hard to occur (i) between the central region 109 and the lateral region 110 and (ii) between the central region 109 and the lateral region 111.

An angle θ1 (a tilt angle of the sidewall), at which the sidewalls 101rs of the rib region 101r are to the horizontal direction, preferably falls within the range of 45 degrees to 80 degrees. In a case where the angle θ1 is not less than 45 degrees, it becomes possible to prevent an optical mode field located in the rib region 101r from diffusing toward the slab regions 101s. This ultimately allows a reduction in optical loss. In a case where the angle θ1 is not more than 80 degrees, it becomes possible to sufficiently enlarge (i) a connection region between the central region 105 and respective of the lateral region 106 and the lateral region 107 in the first core region and (ii) a connection region between the central region 109 and respective of the lateral region 110 and the lateral region 111 in the second core region. It is therefore possible to prevent an electrical disconnection of the first core region and the second core region from occurring in the connection regions. This allows an improvement in yield rate, in a case where (i) the thickness hs of each of the slab regions 101s or (ii) the implantation density of the P-type dopant or the N-type dopant is fluctuated, for example, by approximately 10%. The same applies to (i) an tilt angle θ2 of each of the side surfaces 105s of the central region 105 and (ii) a tilt angle θ3 of each of the sidewalls 120s of the undoped region 120.

In the rib waveguide core 101, (i) the PN junction between the lateral regions 106 and 111 and (ii) the PN junction between the lateral regions 107 and 110 are each located so as to be lower, in the vertical direction, than the PN junction between the central regions 105 and 109. Therefore, the depletion layer 113 in the slab regions 101s is located so as to be lower, in the vertical direction, than the depletion layer 113 in the rib region 101r. This allows an increase in spatial overlap between the electric field profile of guided light and the depletion layer 113 in the rib waveguide core 101. This makes it possible to increase the efficiency of carrier density variations and further lower the driving voltage.

Furthermore, in the rib waveguide core 101, a right side part of the central region 105 and a left side part of the lateral region 110 are provided so as to be next to each other in the horizontal direction, and thus form a PN junction. Similarly, in the rib waveguide core 101, a left side part of the central region 105 and a right side part of the lateral region 111 are provided so as to be next to each other in the horizontal direction, and thus form a PN junction. The depletion layer 113 is also formed at each of those PN junctions through the application of the reverse bias voltage to the PN junctions. A depletion layer 113 formed between the central region 105 and respective of the lateral region 110 and the lateral region 111 extends in the oblique direction at the boundary between the rib region 101r and the corresponding slab region 101s. The oblique direction is approximately parallel to a direction in which the sidewalls 101rs are inclined which are located directly above the depletion layer 113.

Note that, in the cross section illustrated in FIG. 1, the sidewalls 101rs each linearly extend in the oblique direction. However, the sidewalls 101rs are not limited as such. Alternatively, in the cross section illustrated in FIG. 1, sidewalls 101rs each can extend in the oblique direction, in a curved manner (see FIG. 2) or in a stepwise manner (see FIG. 3), provided that a width of the rib region 101r, as measured at a location of the height hs, is wider than a width of the rib region 101r as measured at a location of the height hr, ultimately provided that (i) a width of a lower end of the central region 105 is wider than a width of an upper end of the undoped region 120 and (ii) a width of a lower end of the central region 109 of the second core region is wider than a width of the upper end of the central region 105 of the first core region.

Figure 2:
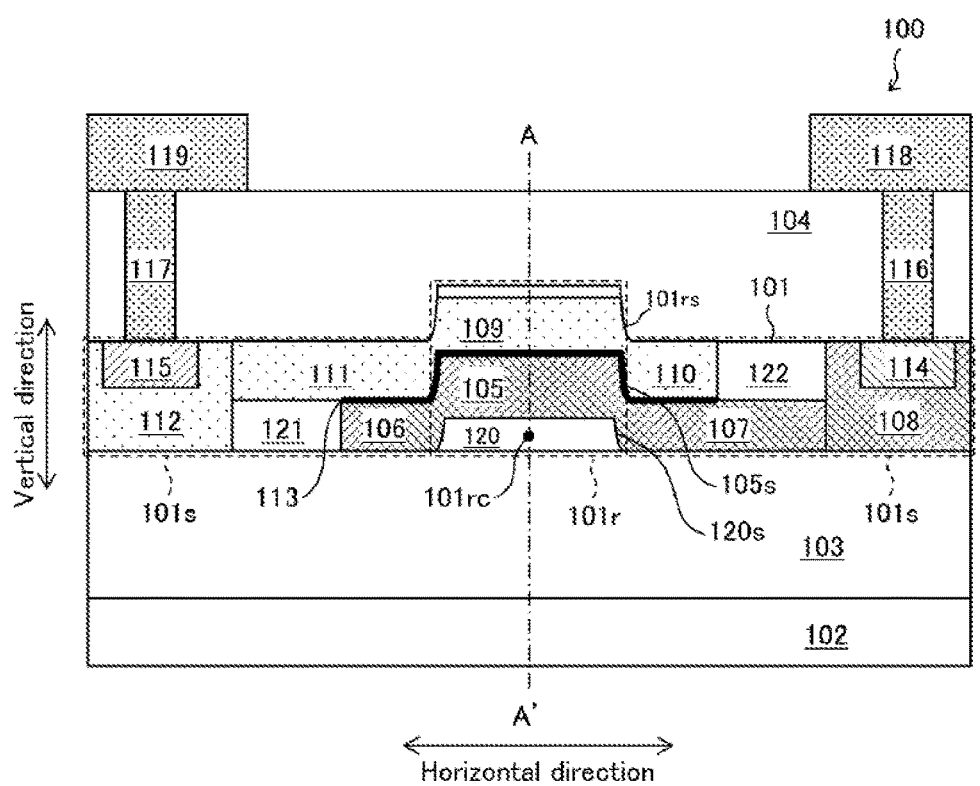
FIG. 2 is a cross-sectional view of Variation 1 of the optical waveguide element illustrated in FIG. 1.
Figure 3:
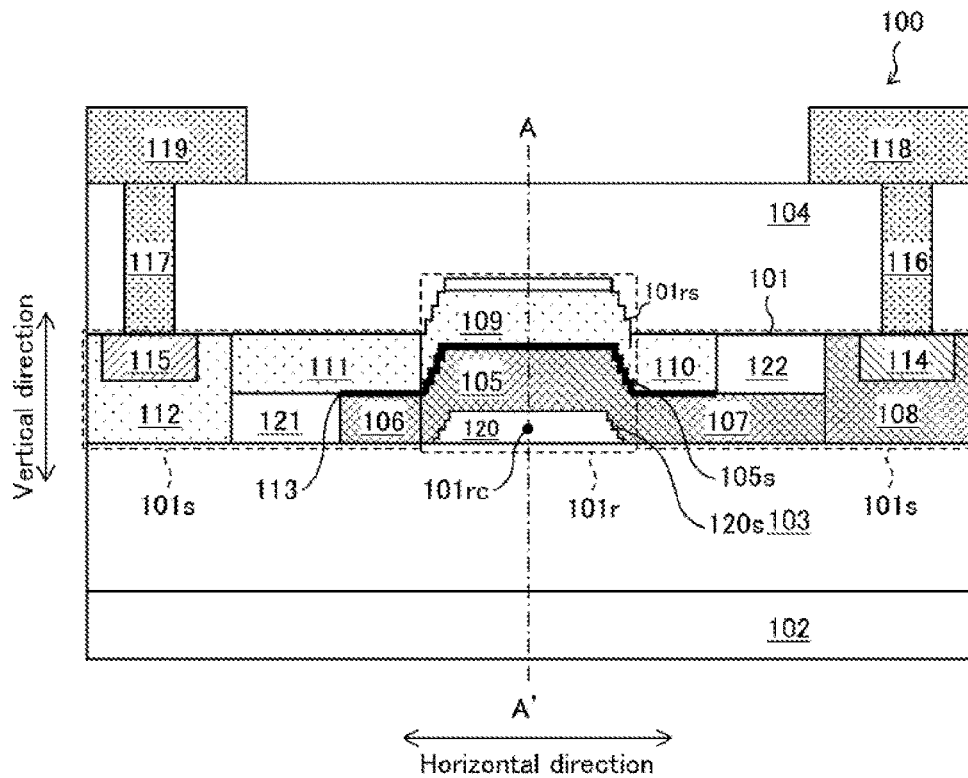
FIG. 3 is a cross-sectional view of Variation 2 of the optical waveguide element illustrated in FIG. 1.
Figure 4:
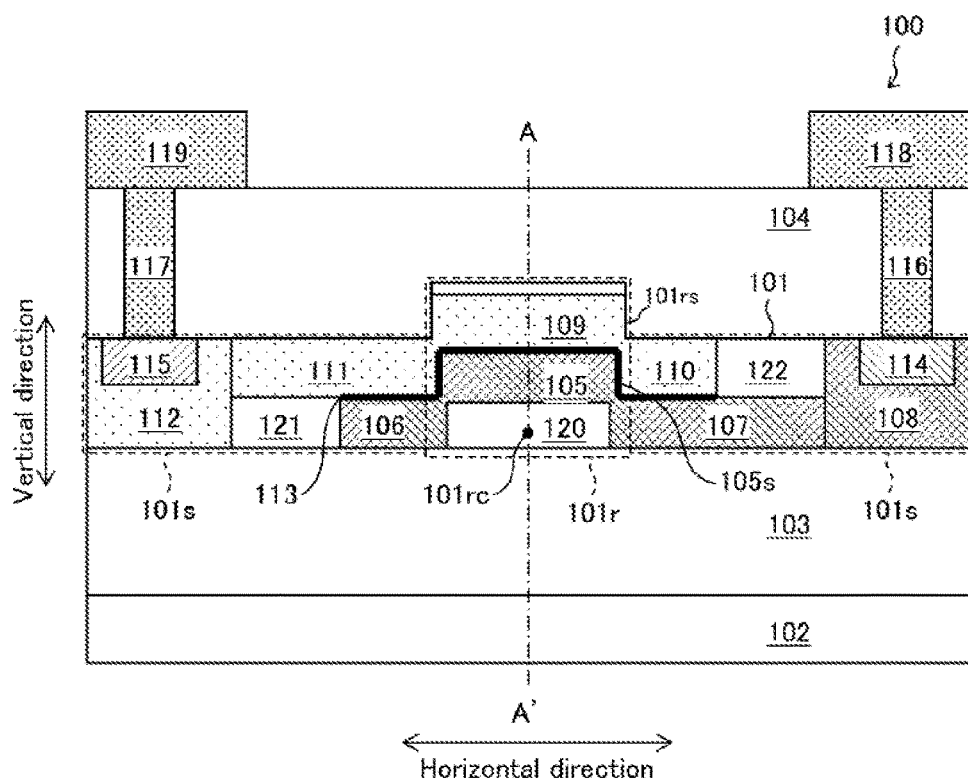
FIG. 4 is a cross-sectional view of Variation 3 of the optical waveguide element illustrated in FIG. 1.

Note also that employed in Embodiment 1 is a configuration in which (i) the sidewalls 120s of the undoped region 120 and (ii) the sidewalls 105s of the central region 105 of the first core region are each inclined (see FIGS. 1 through 3). With the configuration, a constriction of the first core region can be prevented from occurring (i) between the central region 105 and the lateral region 106 and (ii) between the central region 105 and the lateral region 107. However, the present invention is not limited as such. Alternatively, the central region 105 of the first core region can have a width wider than that of the undoped region 120 (see FIG. 4). This makes it possible to prevent the constriction of the first core region, without inclining the sidewalls 120s of the undoped region 120 and the sidewalls 105s of the central region 105 of the first core region. Furthermore, employed in Embodiment 1 is a configuration in which the sidewalls 105s of the central region 105 of the first core region and the sidewalls of the central region 109 of the second core region (i.e., the sidewalls 101rs of the rib region 101r) are each inclined (see FIGS. 1 through 3). This can prevent a constriction of the second core region from occurring (i) between the central region 109 and the lateral region 110 and (ii) between the central region 109 and the lateral region 111. However, Embodiment 1 of the present invention is not limited as such. Alternatively, a width (i.e., the width of the rib region 101r) of the central region 109 of the second core region can be wider than that of the central region 105 of the first core region (see FIG. 4). This makes it possible to prevent a constriction of the second core region, without inclining (i) the sidewalls 105s of the central region 105 of the first core region and (ii) the sidewalls of the central region 109 of the second core region. A further effect of preventing a constriction can be brought about, by combining (i) a configuration in which the sidewalls 120s of the undoped region 120 and the sidewalls 105s of the central region 105 of the first core region are each inclined and (ii) a configuration in which the central region 105 of the first core region has a width wider than that of the undoped region 120.

Figure 5:
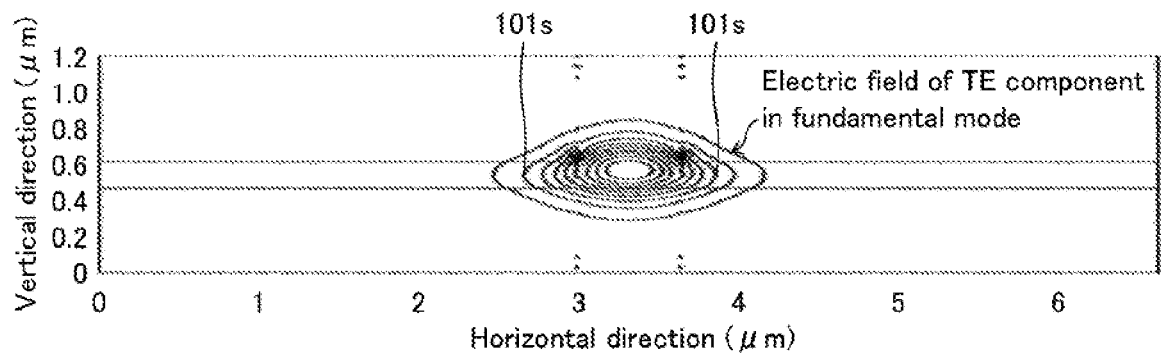
FIG. 5 is a graph illustrating an electric field profile of guided light at the cross section illustrated in FIG. 1, the electric field profile being obtained with the use of a simple numerical analysis.

In order to obtain an electric field profile (i.e., mode field) of guided light in the cross section illustrated in FIG. 1 with the use of a simple numerical analysis, a simulation was run with the use of a structure in which the sidewalls 101rs each extend in the vertical direction. FIG. 5 illustrates the result of the simulation. An electric field profile obtained in a configuration in which an angle, at which each of the sidewalls 101rs is to the horizontal direction, is greater than 45 degrees is approximately equal to that of a configuration in which the sidewalls 101rs each extend in the vertical direction. It is therefore possible to estimate the effect, which is brought about by Embodiment 1, by merely making an analysis with the use of an electric field profile obtained in the configuration in which the sidewalls 101rs each extend in the vertical direction. All of the following electric field profiles are obtained in a configuration in which the sidewalls 101rs each extend in the vertical direction. As FIG. 5 illustrates, an electric field profile of a TE component of guided light in a fundamental mode, is also localized in the slab regions 101s.

Note that FIG. 5 shows an electric field generated by guided light with the use of a linear scale. Further, FIG. 5 shows a profile derived on the assumption that wr is 650 nm, hr is 220 nm, hs is 160 nm, and the guided light has a wavelength of 1550 nm. In a case where the depletion layer 113 in the slab regions 101s is located so as to be lower, in the vertical direction, than the depletion layer 113 in the rib region 101r, the spatial overlap can be increased between the electric field profile of guided light and the depletion layer 113 in the rib waveguide core 101.

In the structure illustrated in FIG. 5, the depletion layer 113 is partially bent at an angle of 90°. Such a bent part may, in actuality, be rounded as a result of influence of (i) a profile of implantation of a dopant element exhibited during ion implantation and (ii) thermal diffusion caused during annealing. Such a rounded bent part does not cause much influence on the effect of the depletion layer 113.

In a case where a reverse bias voltage applied across a part in which the PN junction is formed, a horizontal spread (width) of the depletion layer 113 is substantially unchanged. In contrast, a vertical spread (vertical location or thickness) of the depletion layer 113 is changed. According to the profile of guided light localized in the rib waveguide core 101, the vertical spread is small, i.e., is approximately not larger than a half the horizontal spread. This means that (i) the efficiency of refractive index modulation can be more easily improved and (ii) a voltage for driving the optical waveguide element 100 can be more easily reduced by changing the thickness of the depletion layer 113 than by changing the width of the depletion layer 113.

With the above configurations and mechanisms, the optical waveguide element 100 brings about the following effects.

Mere presence of the protruding section allows guided light to be localized in the rib region 101r and its vicinity. This allows a reduction in light scattering caused by roughness of the sidewalls, and ultimately allows a reduction in optical loss in the optical waveguide element 100. Furthermore, in the optical waveguide element 100, the regions each having the first electrical conductivity and the regions each having the second electrical conductivity are optimized so as to achieve a lower driving voltage. In so doing, the reduced optical loss and the lower driving voltage are achieved by a measure other than an increase in size of the optical waveguide element 100. This makes it possible to prevent an increase in size of the optical waveguide element 100.

The depletion layer 113 extends toward the slab regions 101s. The depletion layer 113 in the slab regions 101s is located so as to be different (specifically, lower) in the vertical direction from (than) the depletion layer 113 in the rib region 101r. This allows an increase in spatial overlap between the electric field profile of guided light and the depletion layer 113 across the entire region of the rib waveguide core 101. This makes it possible to increase the efficiency of carrier density variations and further lower the driving voltage.

The connection regions 108 and 112 each have a thickness of hs, which is equal to the thickness of the corresponding slab region 101s. This allows a reduction in series resistance (i.e., (i) a resistance from a low-resistance region 114 described below to the boundary between the connection region 108 and the lateral region 107 and (ii) a resistance from a low-resistance region 115 described below to the boundary between the connection region 112 and the lateral region 111). This makes it possible to reduce an RC time constant, which is determined on the basis of the series resistance and a capacitance of the PN junction. The optical waveguide element 100 can therefore have an increased modulation frequency.

The optical waveguide element 100 is configured such that guided light has an electric field profile that is optimized as a result of the cross-sectional shape of the rib waveguide core 101 illustrated in FIG. 1. The shape of the depletion layer 113 is, in contrast, optimized as a result of an arrangement of the regions each having the first electrical conductivity and the regions each having the second electrical conductivity as well as a dopant distribution, independently of the electric field profile of guided light. This makes it easy to reduce the optical loss and lower the driving voltage in the optical waveguide element 100.

FIG. 5 illustrates a case where the optical waveguide element 100 is configured such that wr is 650 nm, hr is 220 nm, and hs is 160 nm. The respective values of wr, hr, and hs are, however, not limited as such. Those dimensions of the optical waveguide element 100 can be changed as appropriate, provided that (i) guided light propagating through the rib waveguide core 101 ideally has a single mode and (ii) the depletion layer 113 is formed appropriately.

The optical waveguide element 100 is configured such that the first electrical conductivity is the P-type and that the second electrical conductivity is the N-type. Alternatively, the first electrical conductivity can be the N-type and the second electrical conductivity can be the P-type.

The following description will discuss how to form the PN junction of the optical waveguide element 100 and a high-speed optical modulation element including a high-frequency electrode. It is preferable that hs is not less than 100 nm, in order for (i) regions, each having the first electrical conductivity, and (ii) the regions, each having the second electrical conductivity, to overlap each other in the vertical direction.

The regions each having the first electrical conductivity and the regions each having the second electrical conductivity are formed by doping. The doping can be carried out by, for example, ion implantation. In a case where (i) ion implantation is carried out vertically from above the optical waveguide element 100 and (ii) the ion implantation is carried out simultaneously with respect to the rib region 101r and the slab regions 101s, a depth at which ions are implanted into the rib region 101r is approximately equal to a depth at which ions are implanted into the slab regions 101s. It is therefore possible to form a depletion layer 113 in a desired location, by adjusting (i) the vertical location of the depletion layer 113 on the upper surface of the rib region 101r and (ii) the vertical location of the depletion layer 113 on the upper surfaces of the respective slab regions 101s. In order to simultaneously implant ions into the rib region 101r and the slab regions 101s, it is necessary to optimally adjust hr and hs, on the condition that (i) propagation of guided light is avoided in a higher mode and (ii) a radiation loss of guided light is not increased.

According to the electric field profile of guided light (see FIG. 5), in a case where a vertical center of the depletion layer 113 is located, in the rib region 101r, approximately 80 nm to 100 nm down below a top of the protruding section, the vertical center of the depletion layer 113 approximately coincides with a vertical location at which the electric field generated by guided light becomes largest. This causes an overlap between the electric field profile of guided light and the depletion layer 113 to become approximately maximum. Furthermore, in a case where, in each of the slab regions 101s, each vertical center of the depletion layer 113 is located in the vicinity of a vertical center of a corresponding slab region 101s, the each vertical center of the depletion layer 113 approximately coincides with a location at which the electric field generated by guided light becomes largest. This causes an overlap between the electric field profile of guided light and the depletion layer 113 to become maximum.

The lateral regions 106, 107, 110, and 111 have respective vertical thicknesses that are identical to each other. This allows the vertical center of the depletion layer 113 in each slab region 101s to coincide with the vertical center of the each slab region 101s. Even if the thicknesses of the respective lateral regions 106, 107, 110, and 111 involve variations of approximately not more than 5%, such variations will hardly adversely affect the optical property and electrical property of the optical waveguide element 100. The lateral regions 106, 107, 110, and 111 can therefore be regarded as having an equal thickness, provided that the variations fall within the above range.

(i) The vertical location of the upper surface of the rib region 101r and (ii) the vertical locations of the upper surfaces of the respective slab regions 101s are almost in conformity of the formation of a PN junction caused by simultaneous ion implantation into the rib region 101r and the slab regions 101s. Such ion implantation can simplify the process of producing the optical waveguide element 100 and improve the accuracy of producing the optical waveguide element 100. This ultimately facilitates integration of the optical waveguide element 100 with other circuits. Note that it is only necessary to implant ions into the rib region 101r and each slab region 101s separately, in a case where it is difficult to meet conditions that conform to such ion implantation or where there is a need to separately adjust the vertical center of the depletion layer 113 in the rib region 101r and the vertical center of the depletion layer 113 in each slab region 101s. In order to activate the element implanted and improve the electrical conductivity, an annealing process may be carried out at each ion implantation stage as necessary.

The above description has discussed that the optical waveguide element 100 can be configured such that the first electrical conductivity and the second electrical conductivity are the P-type and the N-type, respectively, or the N-type and the P-type, respectively. Which one of the combinations is to be used can be determined depending from property to property (e.g., diffusion coefficient) of the element to be implanted.

The central region 105 and the lateral regions 106 and 107 can be formed through a single operation of ion implantation by self-alignment. In a case where the rib waveguide core 101 is made of crystalline silicon, for example, boron can be used as the P-type ion to be implanted. By adjusting an accelerating voltage of the ion implantation, it is possible to form (i) a central region 105 in the rib region 101r and (ii) lateral regions 106 and 107 each roughly on a lower half side of the corresponding slab region 101s.

Formation of the connection region 108 requires two stages of ion implantation. The first stage of ion implantation is identical to the above ion implantation by self-alignment. This allows a connection region 108 to be formed approximately on a lower half side of the slab region 101s on the right. In the second stage of ion implantation, (i) an optical mask or the like is used to restrict the ion implantation region to a vertical direction of the connection region 108, and (ii) the accelerating voltage is reduced. This allows the connection region 108 to be formed approximately on an upper half side of the slab region 101s on the right.

A region, which covers an upper surface of the connection region 108, is subjected to an ion implantation with an increased dose. This causes a low-resistance region 114 having the first electrical conductivity to be formed in the connection region 108 in the corresponding slab region 101s.

The optical waveguide element 100 further includes (i) vertical through lines 116 and 117 located in the horizontal direction with respect to the upper cladding 104, (ii) a surface electrode 118 located above the vertical through line 116, and (iii) a surface electrode 119 located above the vertical through line 117. In Embodiment 1, (i) an upper surface of the low-resistance region 114 is connected to one end of the vertical through line 116, and (ii) the other end of the vertical through line 116 is connected to the surface electrode 118.

The central region 109 and the lateral regions 110 and 111 can be formed by self-alignment. For example, arsenic can be used as the N-type ion to be implanted. By adjusting the accelerating voltage of the ion implantation, it is possible to form (i) a central region 109 above the central region 105 in the rib region 101r and (ii) lateral regions 110 and 111 each approximately on an upper half side of the corresponding slab region 101s.

Formation of the connection region 112 requires two stages of ion implantation as in the formation of the connection region 108. The first stage of ion implantation is identical to the above ion implantation by self-alignment. This allows a connection region 112 to be formed approximately on a lower half side of the slab region 101s on the left. In the second stage of ion implantation, (i) an optical mask or the like is used to restrict the ion implantation region to a vertical direction of the connection region 112, and (ii) the accelerating voltage is reduced. This allows the connection region 112 to be formed approximately on an upper half side of the slab region 101s on the left.

Then, a region, which covers the upper surface of the connection region 112, is subjected to ion implantation with an increased dose. This allows a low-resistance region 115 having the second electrical conductivity to be formed in the connection region 112 in the corresponding slab region 101s.

In Embodiment 1, (i) the upper surface of the low-resistance region 115 is connected to one end of the vertical through line 117 and (ii) the other end of the vertical through line 117 is connected to the surface electrode 119.

The surface electrodes 118 and 119 are each a part of the high-frequency electrode. The vertical through lines 116 and 117 and the surface electrodes 118 and 119 are each made of, for example, metallic aluminum or metallic copper. A high-frequency electric signal is applied to at least one of the surface electrodes 118 and 119, via a capacitor (not shown) which serves as a direct-current (DC) block. Simultaneously with the above application, a DC reverse bias voltage is applied via an inductor (not shown) which serves as an alternating-current (AC) block. This allows high-speed optical modulation.

The depletion layer 113 has a width having a value that allows the depletion layer 113 to substantially entirely cover a horizontal spread of guided light. This causes wd2 to be approximately not less than 300 nm. In regard to the covering of the horizontal spread of guided light, the depletion layer 113 has opposite horizontal ends that are preferably located at respective points at which an electric field generated by the guided light has an attenuation of approximately 13 dB, with respect to a peak value of the electric field generated by the light guided through the rib waveguide core 101. That is, in a case where the horizontal spread of the depletion layer 113 is beyond the points at which an electric field, generated by the guided light, is attenuated by approximately 13 dB with respect to the peak value of the electric field generated by the guided light, the capacitance of the PN junction will be increased, and a speed limit due to an RC time constant will be significant. The depletion layer 113 preferably has opposite horizontal ends located so as to avoid such issues.

Preferably, wd1 falls within a range of 700 nm to 1200 nm. This causes a horizontal distance, between the central point 101rc and respective of the connection region 108 and the connection region 112, to approximately fall within the range of 1000 nm to 1500 nm.

Embodiment 2

(a) of FIG. 6 is a block diagram showing a Mach-Zehnder interferometer. (b) of FIG. 6 is a perspective view of a light modulator 1 including a Mach-Zehnder interferometer. The Mach-Zehnder interferometer has, for example, the following advantages (i) and (ii): (i) it is less subject to external noise and (ii) it has high stability, in temperature change, of modulation operation. Mach-Zehnder interferometers are therefore employed in many light modulators for optical communication.

The Mach-Zehnder interferometer illustrated in (a) of FIG. 6 is configured as follows. A light-entering side waveguide 305 has a light-entering end for use in optical coupling with an optical fiber (not shown) on a light-entering side. The light-entering side waveguide 305 has a light-exiting end connected to a light-entering end of an optical divider section 303. The optical divider section 303 has (i) one light-exiting end connected to a light-entering end of an arm waveguide 306 and (ii) the other light-exiting end connected to a light-entering end of an arm waveguide 307. The arm waveguide 306 has a light-exiting end connected to the light-entering end of a phase modulation section 301. The arm waveguide 307 has a light-exiting end connected to a light-entering end of a phase modulation section 302. The phase modulation section 301 has a light-exiting end connected to a light-entering end of an arm waveguide 308. The phase modulation section 302 has a light-exiting end connected to a light-entering end of an arm waveguide 309. The arm waveguide 308 has a light-exiting end connected to one light-entering end of a light combining section 304. The arm waveguide 309 has a light-exiting end connected to the other light-entering end of the light combining section 304. The light combining section 304 has a light-exiting end connected to a light-entering end of a light-exiting side waveguide 310. The light-exiting side waveguide 310 has a light-exiting end for use in optical coupling with an optical fiber (not shown) on a light-exiting side.

The arm waveguide 306, the phase modulation section 301, and the arm waveguide 308 constitute a first arm section, whereas the arm waveguide 307, the phase modulation section 302, and the arm waveguide 309 constitute a second arm section.

The phase modulation sections 301 and 302 each include one optical waveguide element 100 illustrated in FIG. 1. More specifically, a cross section taken along D-D' in (a) of FIG. 6 corresponds to the cross section illustrated in FIG. 1.

As illustrated in (b) of FIG. 6, the light modulator 1 is usable for optical communication. The light modulator 1 is a silicon light modulator that modulates incoming light by applying, to a silicon (Si) based PN junction, a modulating electric field corresponding to a modulating signal. The light modulator 1 has a layered structure in which the substrate 102, the lower cladding 103, and the upper cladding 104 are stacked in this order.

The light modulator 1 is configured such that the sections illustrated in (a) of FIG. 6 are sandwiched between the lower cladding 103 and the upper cladding 104 so as to serve as an optical waveguide constituting a Mach-Zehnder interferometer.

The light-entering side waveguide 305, the arm waveguides 306, 307, 308, and 309, and the light-exiting side waveguide 310 are each a rectangular waveguide including a rectangular core. The rectangular core is made of, for example, crystalline silicon. The rectangular core has a width of wi and a thickness of hr. In Embodiment 2, (i) wi is 500 nm and (ii) a TE component in the fundamental mode propagates through, as the guided light, the light-entering side waveguide 305, the arm waveguides 306, 307, 308, and 309, and the light-exiting side waveguide 310. The optical divider section 303 and the light combining section 304 are composed of, for example, a 1×2 multimode interferometer and a 2×2 multimode interferometer, respectively. Such multimode interferometers each have a thickness of hr. The members are each realized with the use of a SOI wafer.

It is possible to carry out optical intensity modulation, by inputting a high-frequency electric signal to at least one of the phase modulation sections 301 and 302. It is possible to carry out optical phase modulation, by inputting high-frequency electric signals, which are mutually complementary, to the respective phase modulation sections 301 and 302 so that push-pull driving is carried out. Note that the high-frequency electric signals each have a symbol rate of not less than 10 Gbaud.

In a connection between the phase modulation section 301 and respective of the arm waveguide 306 and the arm waveguide 308, the optical waveguide element 100 preferably has a tapered shape such that the rib region 101r and the slab regions 101s each have a gradually varying width, in terms of avoidance of (i) an increase in optical loss and (ii) higher mode excitation. The same applies to a connection between the phase modulation section 302 and respective of the arm waveguide 307 and the arm waveguide 309.

FIG. 7 is a top view of an optical waveguide element 100' in accordance with Embodiment 2 of the present invention. FIG. 7 also indicates a horizontal direction and a guided light propagating direction. The guided light propagating direction indicated in FIG. 7 is perpendicular to both the horizontal direction and the vertical direction (see FIG. 1).

The optical waveguide element 100' is identical in configuration to the optical waveguide element 100 illustrated in FIG. 1, except that the rib region 101r and the slab regions 101s each have a horizontal width that varies depending on its location in the guided light propagating direction. A cross section of the optical waveguide element 100' taken along D-D' in FIG. 7 corresponds to the cross section of the optical waveguide element 100 illustrated in FIG. 1.

For connection with the arm waveguide 306, the optical waveguide element 100' includes, on the light-entering side of the phase modulation section 301, a first tapered section 401 provided in the guided light propagating direction. The first tapered section 401 has a tapered shape such that (i) the slab regions 101s each have a horizontal width that becomes smaller as a distance from a side, which guided light enters, decreases and that (ii) the slab regions 101s each have a width of roughly 0 at its light-entering end. The rib region 101r has a horizontal width of wi across the entire first tapered section 401. In the first tapered section 401, the rib region 101r has a cross-sectional shape that is approximately congruent with the cross-sectional shape of the rectangular core of the arm waveguide 306. The first tapered section 401 has a length 1a of 30 μm (micrometers) in the guided light propagating direction. The first tapered section 401 has a light-exiting end connected to a light-entering end of a second tapered section 402. In other words, the second tapered section 402 is located to be adjacent to that end of the first tapered section 401 via which guided light exits.

The second tapered section 402 has a tapered shape such that the rib region 101r has a horizontal width that becomes smaller as a distance from the side, which guided light enters, decreases. In the light-entering end of the second tapered section 402, the rib region 101r has a horizontal width of wi, which is equal to that in the first tapered section 401. In the light-exiting end of the second tapered section 402, the rib region 101r has a horizontal width of wr. The second tapered section 402 has a length 1b of 30 μm in the guided light propagating direction.

The lengths 1a and 1b are not limited to 30 μm. They can be as short as possible, provided that it is possible to prevent, in the optical waveguide element 100', an increase in optical loss and higher mode excitation.

In a case where the arm waveguide 306 includes a rectangular core having a width (wi) of larger than 500 nm, it is more likely that a higher excitation occurs. The occurrence of such a higher mode excitation causes a decrease in extinction ratio or a Q value in optical phase modulation.

In contrast, no higher mode excitation occurs in the optical waveguide element 100', as long as the rib region 101r has a width (wr) of less than 700 nm. In view of the circumstances, according to the first tapered section 401, there is further provided, in the rib region 101r which has a cross-sectional shape congruent with that of the rectangular core, slab regions 101s each having a horizontal width that gradually increases. Furthermore, according to the second tapered section 402, the rib region 101r has a horizontal width that gradually increases from wi (500 nm) toward wr (650 nm). It is thus possible to configure a light modulator element which has a small optical loss and a large extinction ratio or Q value. In a case where the optical waveguide element 100' is employed as a phase modulation section 301 of a Mach-Zehnder interferometer, it is possible to prevent (i) an increase in optical loss and (ii) higher mode excitation.

Note that FIG. 7 illustrates an example of the connection between the arm waveguide 306 and the phase modulation section 301. The configuration of the optical waveguide element 100' can also be applied to the connection between the arm waveguide 307 and the phase modulation section 302.

The configuration of the optical waveguide element 100' can also be applied to (i) the connection between the phase modulation section 301 and the arm waveguide 308 and (ii) the connection between the phase modulation section 302 and the arm waveguide 309. In this case, the light-entering end and the light-exiting end are switched from the example of the connection between the arm waveguide 306 and the phase modulation section 301.

The phase modulation sections 301 and 302 each have a length of, for example, 3 mm (millimeters) in the guided light propagating direction.

(Profile Having Depletion Layer and Profile of Each Electrically Conductive Region)

FIGS. 8 and 9 each show, as with FIG. 5, an electric field profile of guided light obtained in a configuration in which the sidewalls 101rs each extend in the vertical direction. FIGS. 8 and 9 each show an example profile of the depletion layer 113 together with contour lines indicative of absolute values of the electric field generated by guided light (TE mode) and the outline of the rib waveguide core 101. The profiles of the depletion layer 113 are obtained in a configuration in which the sidewalls 101rs each extend in the vertical direction. Note, however, that the difference between (i) the profiles and (ii) profiles obtained in a configuration in which the sidewalls 101rs each extend in the oblique direction merely resides in whether or not a connection part bends at a right angle directly below a boundary between the rib region 101r and the respective slab regions 101s. Effect, caused by such a difference, on an overlap with the mode field is negligible. As such, the results, shown in respective FIGS. 8 and 9, can be applied to a configuration in which the sidewalls 101rs each extend in the oblique direction.

The contour lines are obtained by being subjected to normalization in which a peak of an absolute value of an electric field, generated by guided light, is regarded as 1. In the contour lines, the absolute values of the electric field are drawn at intervals of 1 dB. In FIGS. 8 and 9, a point, indicated by "0," is indicative of a peak (0 dB) of the absolute values of the electric field. A depletion layer 113, having the profile illustrated in FIG. 8, causes an overlap between (i) the profile of the electric field generated by the guided light and (ii) the depletion layer to become maximum. This brings about a maximum effect of lowering a driving voltage for the optical waveguide element 100.

In FIGS. 8 and 9, the depletion layer 113 has opposite horizontal ends each approximately located in a location where the absolute value of the electric field generated by guided light is attenuated by 13 dB with respect to the peak value. In this case, the depletion layer 113 has a spread of approximately 1 µm in the horizontal direction, i.e., the center of such spread of 1 µm corresponds to the center of the location of the peak value. In this case, in the phase modulation sections 301 and 302 (each have a length of 3 mm) illustrated in, for example, (a) of FIG. 6 each have an electrical capacitance of approximately 12 pF caused by the PN junction (as has been discussed). Two electric resistors, having approximately 8 ohm in total, are serially connected to respective both sides of the PN junction. Such a serial connection causes an RC time constant to be approximately 100 ps. In order to achieve driving at a symbol rate of not less than 10 Gbaud, (i) an RC time constant is required to be not more than approximately 100 ps. As such, the PN junction preferably has an electrical capacitance of 12 pF. The electrical capacitance is approximately proportional to the horizontal spread of the depletion layer 113. The depletion layer 113 therefore preferably has opposite horizontal ends each located so as to be closer to the center of the depletion layer 113 than to the location where the absolute value of the electric field generated by guided light is attenuated by roughly 13 dB with respect to the peak value. The same applies to a case where the depletion layer 113 has a profile different from that illustrated in FIGS. 8 and 9.

In each of the slab regions 101s of the rib waveguide core 101, the depletion layer 113 has a vertical location (height) of hs/2, that is, a location corresponding to half the thickness of the slab regions 101s relative to the height of the lower surface of the rib waveguide core 101. This causes an overlap between the electric field profile of guided light and the depletion layer 113 to become maximum in the slab regions 101s. Therefore, in each slab region 101s, the depletion layer 113 preferably has a height of hs/2 (where hs is the thickness of each slab region 101s), relative to the height of the lower surface of the rib waveguide core 101.

According to the rib waveguide core 101, the lower surfaces of the respective slab regions 101s and the lower surface of the rib region 101r have identical vertical locations, and the rib waveguide core 101 has a flat lower surface. In the slab regions 101s, the lateral regions 106 and 107 are located on the lower half side in the vertical direction, whereas the lateral regions 110 and 111 are located on the upper half side in the vertical direction. This causes a reduction in series electric resistance. In the slab regions 101s, the lateral regions 106, 107, 110, and 111 each have a thickness of hs/2.

In order to realize, in the rib region 101r, such a maximum overlap between the electric field profile generated by guided light and the depletion layer 113, the depletion layer 113 has a height of hr/2 relative to the height of the lower surface of the rib waveguide core 101 in the rib region 101r.

In the rib region 101r, from the viewpoint of reduction of the series electric resistance, (i) the central region 105 can be formed to be thicker than the lateral regions 106 and 107 and (ii) the central region 109 can be formed to be thicker than the lateral regions 110 and 111. Such formations, however, cause an increase in optical loss due to carrier absorption. In view of the circumstances, according to the optical waveguide element 100, (i) the central region 105 is formed to have a thickness equal to those of the lateral regions 106 and 107 and (ii) the central region 109 is formed to have a thickness equal to those of the lateral regions 110 and 111. In the rib region 101r, a height of a lower surface of the central region 105 is (hr/2−hs/2), and a height of an upper surface of the central region 109 is (hr/2+hs/2) relative to the height of the lower surface of the rib waveguide core 101.

The rib region 101r has an undoped region, which is formed at least one of (i) directly above and (ii) directly below the central regions 105 and 109. Note that no P-type or N-type dopant has intentionally been implanted in such an undoped region. The undoped region may have a slight dopant distribution due to diffusion but hardly adversely affect the optical property of the optical waveguide element 100.

The depletion layer 113 can be formed, by (i) forming a rib waveguide core 101 with the use of optical lithography and dry etching and then (ii) separately carrying out ion implantation with respect to the rib region 101r and the slab regions 101s. Note that the ion implantation with respect to the rib region 101r may be carried out before or after ion implantation with respect to the slab regions 101s. In a case where the series resistance needs to be reduced, the central regions 105 and 109 each simply need to have a larger thickness.

According to the profile illustrated in FIG. 8, the depletion layer 113 extends vertically at a boundary between the rib region 101r and the respective slab regions 101s. This causes an increase in at least one of (i) electric resistance caused by the connection between the central region 105 and the lateral region 106, (ii) electric resistance caused by the connection between the central region 105 and the lateral region 107, (iii) electric resistance caused by the connection between the central region 109 and the lateral region 110, and (iv) electric resistance caused by the connection between the central region 109 and the lateral region 111. This may, however, cause a problem of increasing a series electric resistance. In order to avoid the problem, the depletion layer 113 can be shaped so as to extend horizontally in a straight line (with no vertically extending part) as illustrated in FIG. 9. In this case, the depletion layer 113 is formed to have a height of hs/2 in the rib region 101r, which height is equal to that of the depletion layer 113 in the slab regions 101s. Furthermore, in this case, the central region 109 in the rib region 101r is formed to have an upper surface with a height of hs.

In order to form such a depletion layer 113, ion implantation is first carried out simultaneously in the rib region 101r and the slab regions 101s. At this stage, parts that will serve as respective slab regions 101s of the rib waveguide core 101 after etching each have a height of hr, which is equal to the height of the rib region 101r. Then, a rib waveguide core 101 is formed by carrying out optical lithography and dry etching. This causes each of the slab regions 101s to have a height of hs.

For the purpose of integration with other circuits, the depletion layer 113 can be formed by (i) carrying out optical lithography and dry etching so as to form a rib waveguide core 101 before ion implantation and (ii) simultaneously carrying out the ion implantation in the rib region 101r and the slab regions 101s so that the ion implantation step is simplified. In this case, the depletion layer 113 has a profile different from those illustrated in FIGS. 8 and 9. In the rib region 101r, the depletion layer 113 has a vertical location of (hr−hs/2), and the central region 105 has a lower surface with a height of (hr−hs).

As has been discussed, the depletion layer 113 can have a profile that varies according to whether the highest priority is given to (i) lower the driving voltage by increasing an overlap between the electric field profile of guided light and the depletion layer 113, (ii) decrease the series electric resistance for high-speed refractive index modulation, or (iii) simplify the process for integration. In contrast, the depletion layer 113 in the rib region 101r has a vertical location (height), as measured at a location of the height of the lower surface of the rib waveguide core 101, which falls within the range of hs/2 to (hr−hs/2) (where hs is the thickness of each slab region 101s, and hr is the thickness of the rib region 101r) in a direction away from the substrate 102 (upward).

The description above deals with the optical waveguide element 100. However, the optical waveguide element 100' may also be described similarly. The description above holds true no matter whether the first electrical conductivity and the second electrical conductivity are of P-type and N-type, respectively, or N-type and P-type, respectively.

[Recap]

An optical waveguide element in accordance with an aspect of the present invention includes: a rib waveguide, serving as a core section, which includes (i) a rib region having a first height and (ii) two slab regions located such that the rib region is sandwiched, in a first direction, between the two slab regions, each of the two slab regions having a second height which is lower than the first height, the core section including a first core region and a second core region which are located so as to overlap each other in a second direction which is perpendicular to the first direction, the first core region and the second core region forming a PN junction, a depletion layer being formed between the first core region and the second core region, the depletion layer extending from the rib region to both of the two slab regions, the depletion layer being located so as to be lower, in the second direction, in each of the two slab regions than in the rib region, the rib region having a width, as measured at a location of the second height, which is wider than a width as measured at a location of the first height.

The configuration includes a rib waveguide as a core section. This allows light (i.e., light guided through the core section) to be locally guided in the rib region and its vicinity. Therefore, even if the sidewalls of the core section are rough, the above configuration makes it possible to reduce light scattering caused by roughness of the sidewalls and consequently reduce the optical loss. Further, the configuration allows a depletion layer to be formed between the first core region and the second core region, which depletion layer extends from the rib region to at least one of the two slab regions. This allows (a) an increase in efficiency of refractive index modulation and (b) a reduction in driving voltage without (1) increasing the doping densities of the respective first and second core regions and/or (2) increasing the length of the element. It follows that the configuration allows a reduction in driving voltage without causing any optical loss and/or enlarging an optical waveguide element.

The above configuration also makes it possible to increase the spatial overlap between the electric field profile of guided light and the depletion layer in the slab regions. This makes it possible to increase the efficiency of carrier density variations and further lower the driving voltage.

The configuration also makes it possible to increase the spatial overlap between the electric field profile of guided light and the depletion layer across the entire region of the core section. This makes it possible to increase the efficiency of carrier density variations and further lower the driving voltage.

According to the configuration, in a case where the first core region and the second core region each have a uniform or substantially uniform thickness, in the rib region, (i) the width of the lower end of the second core region is wider than the width of the upper end of the first core region and (ii) the width of the lower end of the first core region is wider than the width of the upper end of the undoped region located below the first core region. This causes a constriction of the first core region and the second core region to be hard to occur between the rib region and the slab regions. Therefore, an electrical disconnection of the first core region and the second core region is hard to occur at the boundary between the rib region and the respective slab regions. As a result, it is possible to achieve an optical waveguide element that is tolerant of manufacturing errors.

An optical waveguide element in accordance with an aspect of the present invention includes: a rib waveguide, serving as a core section, which includes (i) a rib region having a first height and (ii) two slab regions located such that the rib region is sandwiched, in a first direction, between the two slab regions, each of the two slab regions having a second height which is lower than the first height, the core section including a first core region and a second core region which are located so as to overlap each other in a second direction which is perpendicular to the first direction, the first core region and the second core region forming a PN junction, a depletion layer being formed between the first core region and the second core region, the depletion layer extending from the rib region to both of the two slab regions, the depletion layer being located so as to be lower, in the second direction, in each of the two slab regions than in the rib region, in the rib region, a width of a lower end of the second core region being wider than a width of an upper end of the first core region.

The configuration makes it possible to achieve an optical waveguide element that has a reduced optical loss, a lower driving voltage, and a reduced size. Since, in the rib region, the width of the lower end of the second core region is wider than the width of the upper end of the first core region, a constriction of the second core region is hard to occur between the rib region and the slab regions. Therefore, an electrical connection of the second core region is hard to occur at the boundary between the rib region and the respective slab regions.

An optical waveguide element in accordance with an aspect of the present invention includes: a rib waveguide, serving as a core section, which includes (i) a rib region having a first height and (ii) two slab regions located such that the rib region is sandwiched, in a first direction, between the two slab regions, each of the two slab regions having a second height which is lower than the first height, the core section including a first core region and a second core region which are located so as to overlap each other in a second direction which is perpendicular to the first direction, the first core region and the second core region forming a PN junction, a depletion layer being formed between the first core region and the second core region, the depletion layer extending from the rib region to both of the two slab regions, the depletion layer being located so as to be lower, in the second direction, in each of the two slab regions than in the rib region, in the rib region, a width of a lower end of the first core region being wider than a width of an upper end of an undoped region which is located below the first core region in the rib region.

The configuration makes it possible to achieve an optical waveguide element that has a reduced optical loss, a lower driving voltage, and a reduced size. Since, in the rib region, the width of the lower end of the first core region is wider than the width of the upper end of the undoped region located below the first core region, a constriction of the first core region is hard to occur between the rib region and the slab regions. Therefore, an electrical disconnection of the first core region is hard to occur at the boundary between the rib region and the respective slab regions.

An optical waveguide element in accordance with an aspect of the present invention is preferably configured such that the rib region has sidewalls each of which is inclined at an angle of not smaller than 45 degrees and not greater than 80 degrees.

An optical waveguide element in accordance with an aspect of the present invention is preferably configured such that the first core region has side surfaces each of which is inclined in the rib region at an angle of not smaller than 45 degrees and not greater than 80 degrees.

An optical waveguide element in accordance with an aspect of the present invention is preferably configured such that the undoped region has side surfaces each of which is inclined in the rib region at an angle of not smaller than 45 degrees and not greater than 80 degrees.

The tilt angle of not smaller than 45 degrees makes it possible to prevent an optical mode field present in the rib region from spreading to the slab regions. This allows a reduction in optical loss. The tilt angle of not greater than 80 degrees makes it possible to sufficiently increase the connection regions between the rib region and the slab regions.

An optical waveguide element in accordance with an aspect of the present invention is preferably configured such that an end, in the first direction, of the depletion layer is defined so that an attenuation rate of an electric field, generated by guided light, becomes not more than 13 dB with respect to a peak value of the electric field in the core section.

In a case where the spread of the depletion layer in the first direction is beyond the points at which an attenuation of an electric field generated by guided light is approximately 13 dB with respect to the peak value of the electric field, the capacitance of the PN junction between the first core region and the second core region will be increased, and the speed limit due to an RC time constant will be significant. The depletion layer preferably has opposite ends in the first direction that are located so as to avoid such issues.

An optical waveguide element in accordance with an aspect of the present invention is preferably configured such that in at least one of the two slab regions, a thickness, in the second direction, of the first core region is equal to a thickness, in the second direction, of the second core region.

An optical waveguide element in accordance with an aspect of the present invention is preferably configured such that the optical waveguide element includes a first tapered section and a second tapered section, the first tapered section having a tapered shape such that the two slab regions each have a width in the first direction, the width becoming smaller as a distance from one of a light-entering end and a light-exiting end of the first tapered section decreases, a second tapered section being located so as to be adjacent to the other of the light-entering end and the light-exiting end of the first tapered section, the second tapered section having a tapered shape such that a width, in the first direction, of the rib region becomes smaller as a distance from one of a light-entering end and a light-exiting end of the second tapered section decreases.

With the configuration, an increase in optical loss and higher mode excitation can be prevented in a case where the optical waveguide element of an embodiment of the present invention is used as a phase modulation section for each arm of a Mach-Zehnder interferometer.

An optical waveguide element in accordance with an aspect of the present invention is preferably configured such that in at least one of the two slab regions, a height, in the second direction, of the depletion layer is hs/2 relative to a height, in the second direction, of a lower surface of the core section, the hs indicating a thickness of the at least one of the two slab regions.

The configuration allows the overlap between the electric field profile of guided light and the depletion layer to become maximum in the slab regions.

An optical waveguide element in accordance with an aspect of the present invention is preferably configured such that in the rib region, a height, in the second direction, of the depletion layer is not less than hs/2 and not more than (hr−hs/2) relative to a height of a lower surface of the core section, the hs indicating a thickness of the at least one of the two slab regions, and the hr indicating a thickness of the rib region.

The configuration allows the overlap between the electric field profile of guided light and the depletion layer to become maximum in the rib region.

An optical waveguide element in accordance with an aspect of the present invention is preferably configured such that in a case where an overlap, between the depletion layer and an electric field generated by guided light, becomes maximum, (i) in the rib region, a height, in the second direction, of a lower surface of the first core region is (hr/2−hs/2) relative to a height, in the second direction, of a lower surface of the core section, and (ii) in the rib region, a height, in the second direction, of an upper surface of the second core region is (hr/2+hs/2) relative to the height, in the second direction, of the lower surface of the core section.

An optical waveguide element in accordance with an aspect of the present invention is preferably configured such that the rib region has an undoped region, in which no dopant is intentionally implanted, at least one of (i) directly above and (ii) directly below the first core region and the second core region.

Each of the above configurations makes it possible to further increase the overlap between the electric field profile of guided light and the depletion layer across the entire core section and reduce the optical loss.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 100, 100': Optical waveguide element
101: Rib waveguide core (core section)
101r: Rib region
101rs: Sidewall of protruding section
101s: Slab region
105: Central region (part of first core region)
106: Side region (part of first core region)
107: Side region (part of first core region)
108: Connection region (part of first core region)
109: Central region (part of second core region)
110: Lateral region (part of second core region)
111: Lateral region (part of second core region)
112: Connection region (part of second core region)
113: Depletion layer
401: First tapered section
402: Second tapered section

The invention claimed is:

1. An optical waveguide element, comprising:
a rib waveguide, serving as a core section, which includes (i) a rib region having a first height and (ii) two slab regions located such that the rib region is sandwiched, in a first direction, between the two slab regions, each of the two slab regions having a second height which is lower than the first height,
the core section including a first core region and a second core region which are located so as to overlap each other in a second direction which is perpendicular to the first direction, the first core region and the second core region forming a PN junction,
a depletion layer being formed between the first core region and the second core region, the depletion layer extending from the rib region to both of the two slab regions,
the depletion layer being located so as to be lower, in the second direction, in each of the two slab regions than in the rib region,
the rib region having a width, as measured at a location of the second height, which is wider than a width as measured at a location of the first height,
the rib region has sidewalls each of which is inclined at an angle of not smaller than 45 degrees and not greater than 80 degrees.

2. An optical waveguide element, comprising:
a rib waveguide, serving as a core section, which includes (i) a rib region having a first height and (ii) two slab regions located such that the rib region is sandwiched, in a first direction, between the two slab regions, each of the two slab regions having a second height which is lower than the first height,
the core section including a first core region and a second core region which are located so as to overlap each other in a second direction which is perpendicular to the first direction, the first core region and the second core region forming a PN junction,
a depletion layer being formed between the first core region and the second core region, the depletion layer extending from the rib region to both of the two slab regions,
the depletion layer being located so as to be lower, in the second direction, in each of the two slab regions than in the rib region,
in the rib region, a width of a lower end of the second core region being wider than a width of an upper end of the first core region,
the first core region has side surfaces each of which is inclined in the rib region at an angle of not smaller than 45 degrees and not greater than 80 degrees.

3. An optical waveguide element, comprising:
a rib waveguide, serving as a core section, which includes (i) a rib region having a first height and (ii) two slab regions located such that the rib region is sandwiched, in a first direction, between the two slab regions, each of the two slab regions having a second height which is lower than the first height,
the core section including a first core region and a second core region which are located so as to overlap each other in a second direction which is perpendicular to the first direction, the first core region and the second core region forming a PN junction,
a depletion layer being formed between the first core region and the second core region, the depletion layer extending from the rib region to both of the two slab regions,
the depletion layer being located so as to be lower, in the second direction, in each of the two slab regions than in the rib region,
in the rib region, a width of a lower end of the first core region being wider than a width of an upper end of an undoped region which is located below the first core region in the rib region,
the undoped region has side surfaces each of which is inclined in the rib region at an angle of not smaller than 45 degrees and not greater than 80 degrees.

4. The optical waveguide element as set forth in claim 1, wherein:
an end, in the first direction, of the depletion layer is defined so that an attenuation rate of an electric field, generated by guided light, becomes not more than 13 dB with respect to a peak value of the electric field in the core section.

5. The optical waveguide element as set forth in claim 1, wherein:
in at least one of the two slab regions, a thickness, in the second direction, of the first core region is equal to a thickness, in the second direction, of the second core region.

6. The optical waveguide element as set forth in claim 1, wherein:
the optical waveguide element includes a first tapered section and a second tapered section,
the first tapered section having a tapered shape such that the two slab regions each have a width in the first direction, the width becoming smaller as a distance from one of a light-entering end and a light-exiting end of the first tapered section decreases,
a second tapered section being located so as to be adjacent to the other of the light-entering end and the light-exiting end of the first tapered section, the second tapered section having a tapered shape such that a width, in the first direction, of the rib region becomes smaller as a distance from one of a light-entering end and a light-exiting end of the second tapered section decreases.

7. The optical waveguide element as set forth in claim 1, wherein:
in at least one of the two slab regions, a height, in the second direction, of the depletion layer is hs/2 relative to a height, in the second direction, of a lower surface of the core section, the hs indicating a thickness of the at least one of the two slab regions.

8. The optical waveguide element as set forth in claim 1, wherein:
in the rib region, a height, in the second direction, of the depletion layer is not less than hs/2 and not more than (hr−hs/2) relative to a height of a lower surface of the core section, the hs indicating a thickness of the at least one of the two slab regions, and the hr indicating a thickness of the rib region.

9. The optical waveguide element as set forth in claim 8, wherein:
in a case where an overlap, between the depletion layer and an electric field generated by guided light, becomes maximum,
(i) in the rib region, a height, in the second direction, of a lower surface of the first core region is (hr/2−hs/2) relative to a height, in the second direction, of a lower surface of the core section, and
(ii) in the rib region, a height, in the second direction, of an upper surface of the second core region is (hr/2+hs/2) relative to the height, in the second direction, of the lower surface of the core section.

10. The optical waveguide element as set forth in claim 8, wherein:
the rib region has an undoped region, in which no dopant is intentionally implanted, at least one of (i) directly above and (ii) directly below the first core region and the second core region.

* * * * *